United States Patent [19]

Metzger et al.

[11] 3,895,543

[45] July 22, 1975

[54] ADJUSTMENT MECHANISM

[75] Inventors: Paul T. Metzger; Wayne D. Mitchell, both of Rochester, N.Y.

[73] Assignee: Sybron Corporation, Rochester, N.Y.

[22] Filed: Jan. 11, 1974

[21] Appl. No.: 432,521

[52] U.S. Cl............... 74/89.15; 74/424.8 R; 74/409
[51] Int. Cl........................................... F16h 27/02
[58] Field of Search................. 74/89.15, 409, 424.8

[56] References Cited
UNITED STATES PATENTS

| | | | |
|---|---|---|---|
| 2,711,102 | 6/1955 | Funk | 74/424.8 R |
| 3,402,613 | 9/1968 | Neusel et al. | 74/89.15 |
| 3,478,608 | 11/1969 | Met | 74/89.15 |
| 3,520,203 | 7/1970 | Hill | 74/89.15 |
| 3,565,515 | 2/1971 | De Mev | 74/89.15 |

*Primary Examiner*—Wesley S. Ratliff, Jr.
*Attorney, Agent, or Firm*—Theodore B. Roessel; J. Stephen Yeo

[57] ABSTRACT

A movable carriage is mounted via threaded connection to a rotatable adjusting element. A guide limits the rotational movement of the carriage. Resilient forces are applied to the carriage in a first direction to assure a tight coupling between the threaded connection, and in a second direction to assure a tight coupling between the guide and the carriage, thereby reducing the backlash and/or deadband in the mechanism to an acceptable level.

4 Claims, 7 Drawing Figures

FIG. I

ADJUSTMENT MECHANISM

BACKGROUND OF THE INVENTION

This invention pertains to a screw type adjusting mechanism in general, and more particularly to adjusting mechanisms wherein the backlash and/or deadband in the mechansim is reduced by resilient forces to an acceptable level.

In the various types of instruments, such as for example, electro-pneumatic control instruments of the type described in a copending patent application Ser. No., 432,511 filed on, Jan. 11, 1974 for Paul T. Metzger and Wayne D. Mitchell, and entitled "Electro-Pneumatic Transducer" some sort of zero bias adjustment is required to balance the lever mechanism under a zero signal condition. The adjustment is usually accomplished by a screw type of mechanism that is rotated to apply a resilient force to the lever mechanism of sufficient amplitude to establish a balanced condition. A zero bias adjustment of this type is disclosed in a U.S. Pat. No. 3,004,546 issued on Oct. 17, 1961 to J. W. Robins et al and entitled "Electro-Pneumatic Transducer". The screw type adjustments of the prior art were generally faced with a dead band and backlash type of problem wherein if a setting is attempted by rotating the screw type device in one direction and the setting is exceeded, the dead band or backlash in the arrangement would require some addition rotary motion in the opposite direction to cover the dead band or backlash before the adjusting effect could be reversed. This is particularly troublesome in delicate lever type mechanism wherein minute forces effect the balance of the system. With the screw type arrangements of the prior art, the operator adjusting the instrument would be required to rock the setting of the adjustment mechanism (between the extremes of the backlash and/or dead band) to achieve the desired balance condition through a trial and error procedure. This proved to be very time consuming and frustrating on the part of the operator.

Once the desired setting was achieved, the adjustment mechanisms of the prior art generally required some sort of locking mechanism to maintain the setting. The locking mechanism generally required that the screw type device be maintained fixed while the locking device is set. Quite often, in attempting to set the locking device, the setting of the adjusting mechanism would be changed therefore requiring a complete repeat of the adjustment procedure. It would be highly desirable if a screw type adjustment could be provided that essentially included no dead band or backlash, and that did not require any locking type devices to maintain its settings.

It is therefore an object of this invention to provide a new and improved screw type adjustment without any measurable dead band or backlash in its operation.

It is also another object of this invention to provide a new and improved screw type mechanism that does not require any locking devices to maintain its settings.

BRIEF DESCRIPTION OF THE INVENTION

A screw type adjustment including a rotatable member and a carriage mounted on the rotatable member with a threaded coupling therebetween so that the carriage moves in response to the rotation of the rotatable member. Guide means are coupled to the carriage to inhibit the rotational movement of the carriage means. Resilient means are coupled to the carriage means for applying a first force in a direction to frictionally bind the threaded coupling between the carriage means and the rotational member, and a second force in a direction to provide a tight coupling between the guide means and the carriage.

The first force provides a rotational coupling generally normal to the rotational movement of the member urging the threads in the carriage and the rotational member together thereby providing a continuous tight frictional coupling therebetween and essentially eliminating any dead band or backlash. The second force is in the direction to cause the carriage means to rotate about the threaded coupling to continuously engage the guide means, thereby essentially eliminating any rotational movement of the carriage means in response to the rotation of the rotary member.

DETAILED DESCRIPTION OF THE INVENTION:

The adjustment mechanism including the invention is to be described in the embodiment of a zero bias adjustment for electro-pneumatic transducers and the like, however, it is to be understood that the adjustment mechanism can be used in a wide variety of instruments and units wherein it is desired to convert a rotation movement into a linear displacement without any noticeable backlash or dead band.

Figure 1:
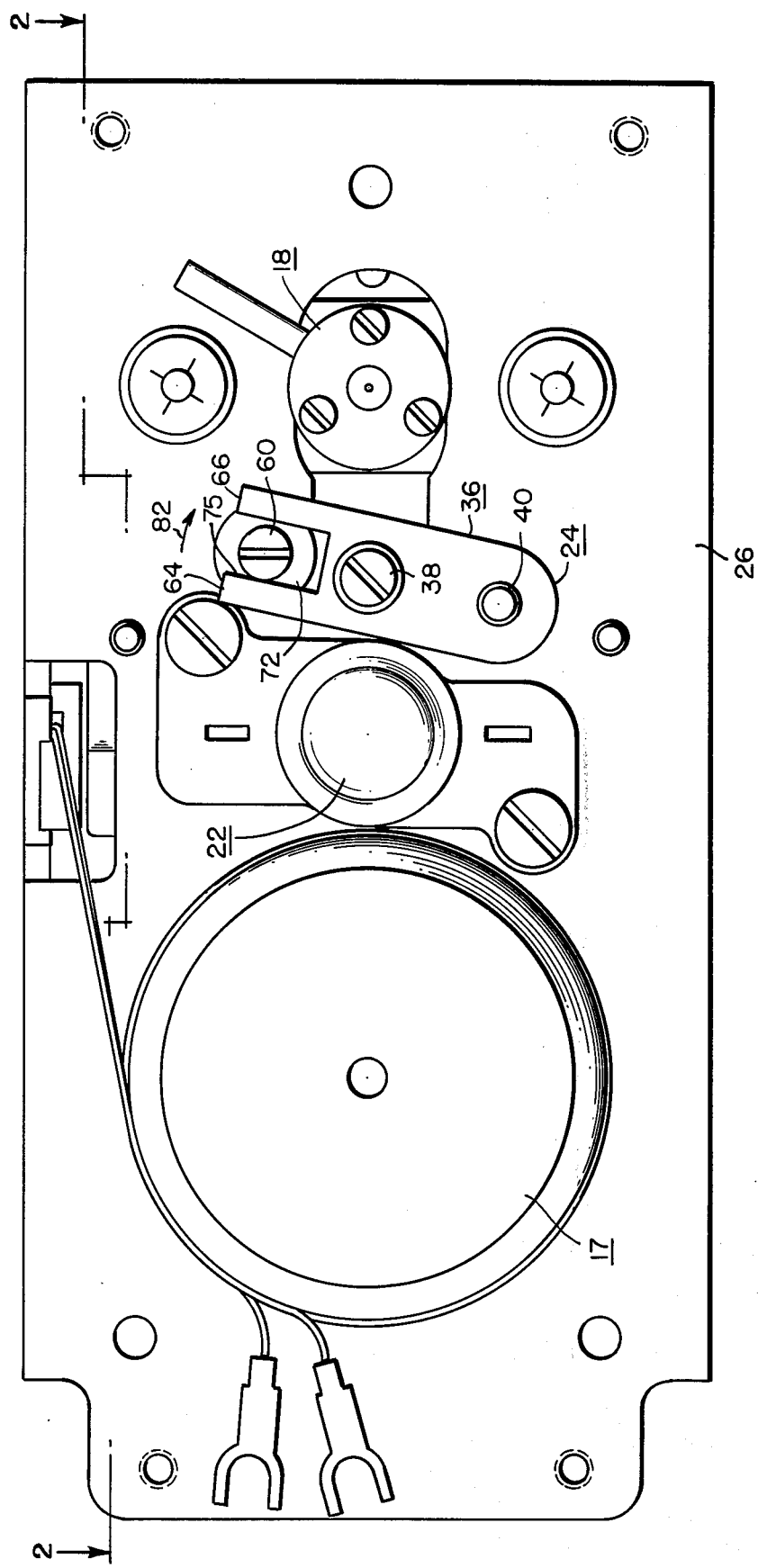
FIG. 1 is a plan view of a electro-pneumatic transducer including the adjustment mechanism of the invention.
Figure 2:
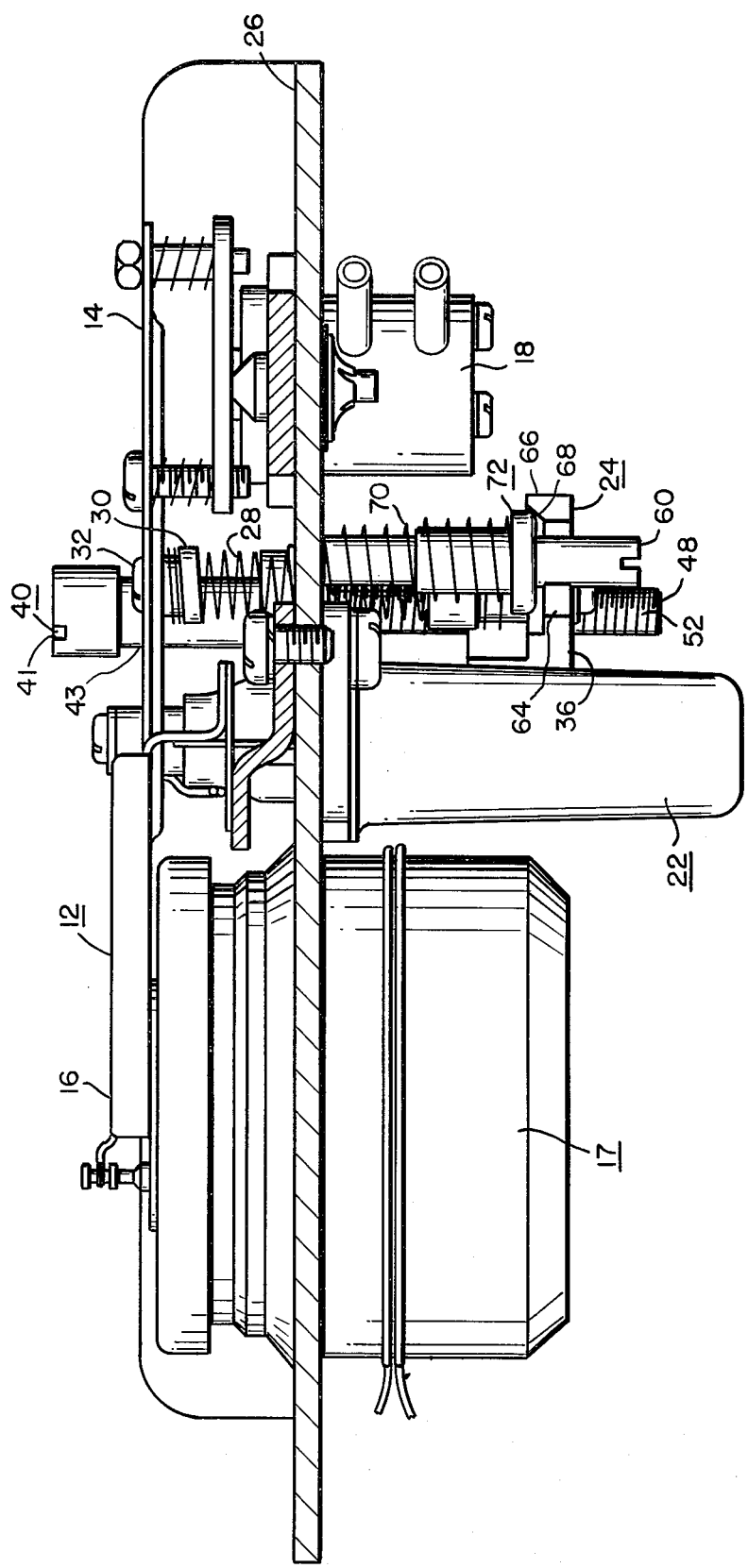
FIG. 2 is a sectional side view of the electro-pneumatic transducer of FIG. 1 taken alongs 2—2.

As illustrated in FIGS. 1 and 2, a lever beam 12 is mounted for pivotal movement about an axis 13 with one end 16 coupled to an electromagnetic transducer 17 while the other end 14 is coupled to a nozzle-baffle arrangement 18. The electro-pneumatic transducer is described in greater 432,511. in the copending patent abovementioned application Ser. No. ,432,511. A damper device 22 is secured to the lever beam 12 to provide a damping function thereto and is described in greater detail in a copending patent application Ser. No. 432,511, Filed on Jan. 11, 1974 for Paul T. Metzger and entitled "Damper Mechanism". An adjustment mechanism 24, including the invention, is mounted to the transducer base 26 and is resiliently coupled to the lever beam 12 to function as the zero bias adjustment when zero electrical input signal is applied to the electromagnetic transducer 17.

Figure 3:
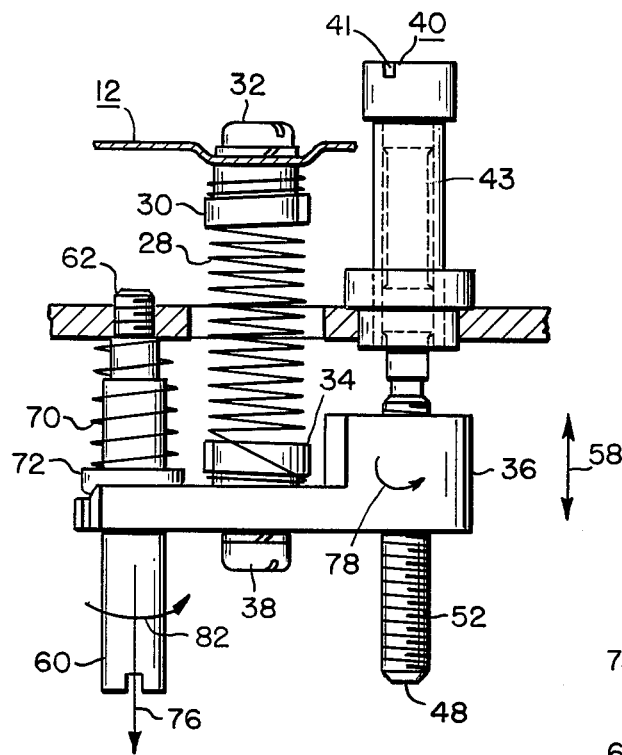
FIG. 3 is a side view of the adjustment mechanism, including the invention, including a portion of the transducer base and a portion of the lever mechanism of the transducer to illustrate the mounting of the adjustment means.

As best seen in FIG. 3, the adjustment mechanism 24 is coupled to the lever beam 12 via a spring 28 as illustrated in FIGS. 2 and 3. One end of the spring 28 is secured to a collar 30 which in turn is secured to the lever beam 12 by a screw 32. Returning to FIG. 3, the other end of the spring 28 is secured to a collar 34, which in turn is secured to an adjustable carriage 36 via a screw 38 that extends through the carriage aperture 46. The carriage 36 is mounted on a zero adjustment screw 40 with a threaded coupling therebetween. The zero adjustment screw 40 includes a cylindrical portion 42 extending through a cylindrical bearing 43 that is "press fit" mounted to the base 26.

Figure 6:
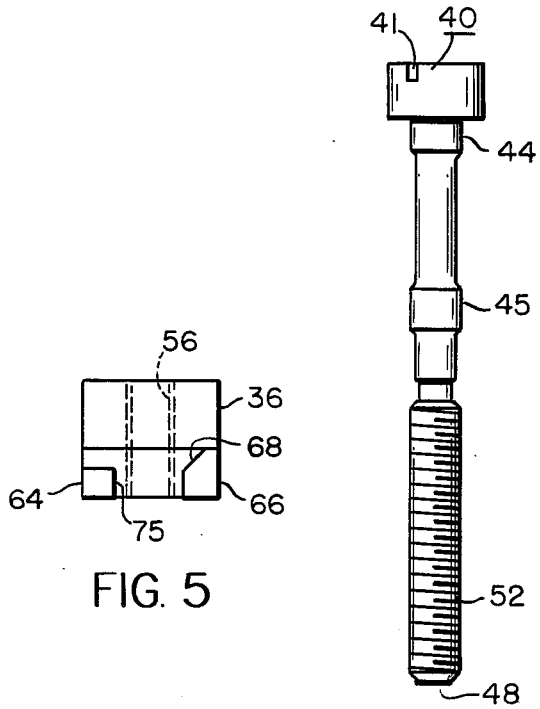
FIG. 6 is a side view of the rotational element in the adjustment mechanism of FIG. 3.

As best seen in FIG. 6, the cylindrical portion 42 is formed with two bearing surfaces 44 and 45 located at opposite ends thereof, each having a larger diameter than the remaining portion of the cylindrical portion. The arrangement is such that the bearing surfaces 44 and 45 engage the cylindrical bearing 43 to provide a tight coupling therebetween to prevent any wobble in the rotational movement of the screw 40. The grooved top 41 of the screw 40 abuts against the top of the cylindrical bearing 43. The carriage 36 is formed with a threaded aperture 56 that mates with the threaded section 52 of the zero adjustment screw 40 so that as the zero adjustment screw 40 is rotated the carriage 36 moves in the direction of the arrows 58 (depending upon the direction of rotation of the zero adjustment screw 40). The position of the carriage 36 relative to the base 26 determines the magnitude of zero bias force applied to the lever beam 12.

Figure 4:
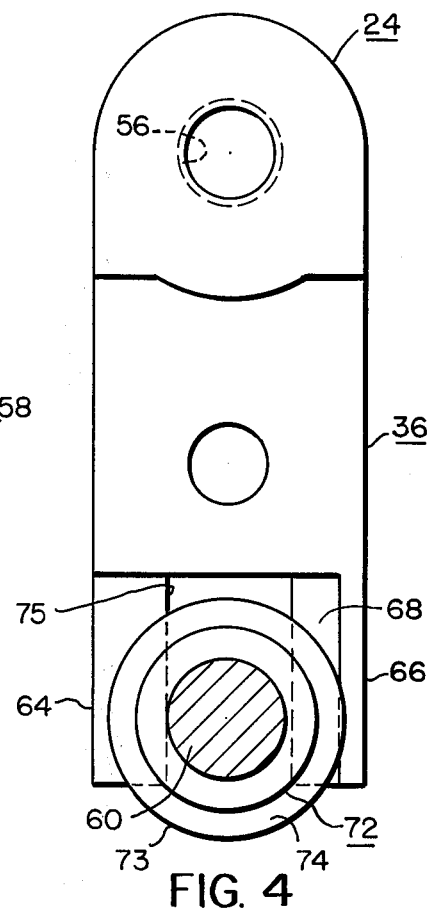
FIG. 4 is a plane view of the carriage of the adjustment means of FIG. 3 including the movable collar.
Figure 5:
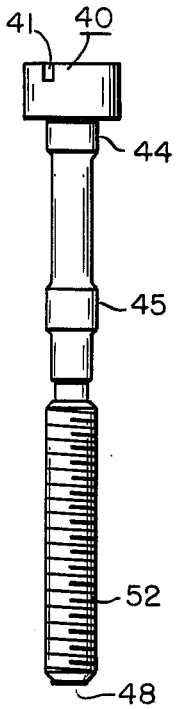
FIG. 5 is a side view of the carriage.
Figure 7:
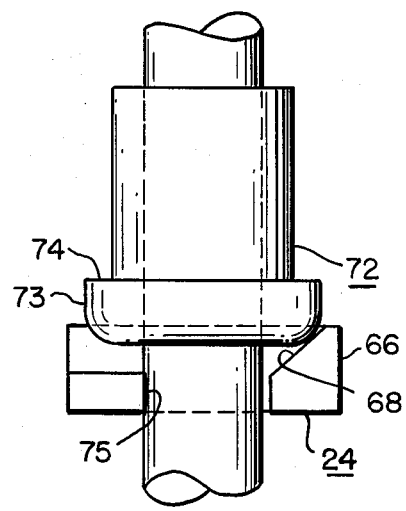
FIG. 7 is a view of the engagement of the movable collar with the carriage.

Guide means are provided for the carriage 36 to prevent the rotational movement thereof. The guide means include a cylindrical shaft 60 secured at one end to the base 26 via a threaded extension 62. The shaft 60 extends through a "U" shaped aperture 61 formed in the carriage 36 between the forcated projections 64 and 66 as illustrated in FIGS. 1, 4 and 5. The height of the forcated projection 64 (as viewed in FIGS. 5 and 7) is substantially less than the height of the forcated member 66. A corner of the forcated projection 66 that faces the shaft 60 and the base 26 is beveled to provide an angularly displaced surface 68. A spring 70 surrounds the portion of the shaft 60 that extends between the base 26 and the carriage 36 to apply a resilient force between the base 26 and the carriage 36 via a collar 72 having an enlarged base 73. The surface 74 of the base 73 facing the spring 70 is flat, while the portion of the base 73 facing the carriage 36 is curved.

The affect of the spring 70 and the collar 72 is two fold. First, the spring 70, through the base 73, applies a resilient force in the direction of an arrows 76 (FIGS. 3 and 7) to provide a rotational moment about the threaded coupling between the carriage 36 and the shaft 48 in a direction designated by the arrow 78 (FIG. 3). This rotational moment results in a continuous tight mesh between the threads of the shaft 48 and of the carriage 36, in effect frictionally binding the threads together. As a result, the tight coupling between the threads minimizes any dead band or backlash therebetween, while the frictional forces tend to maintain the setting of the screw 40. The rotational moment also creates a tight coupling between the bearing surface 44 and 45 and the cylindrical bearing 43 to prevent any wobble therebetween.

Since the height of the forcated projection 64 is substantially less than that of the forcated member 66, the base 73, in response to the resilient force of the spring 70, only engages the beveled surface 68 of the carriage 36. A resilient force is therefore applied to the carriage 36 via the beveled surface 68 so that the side 75 of the forcated projection 64 engages the shaft 60. The a continuous force is applied to the carriage 36 to maintain a tight coupling between the forcated projection 64 and the shaft 60 thereby eliminating any rotational movement on the part of the carriage 36 in response to the rotation of the adjustment 40.

With the adjustment mechanism of the invention, the effect of dead band and backlash is essentially eliminated. Because of (1) the tight threaded coupling between the carriage 36 and the adjustment screw 40 (2) the right bearing coupling between the bearing sections 44 and 45 and the bearing 43 and (3) the tight coupling between the carriage 36 and the shaft 60, the movement of the carriage 36 closely follows the rotational movement of the screw adjustment 40, essentially eliminating any backlash, dead band, or wobble, in the mechanism. In setting the adjustment mechanism 24, the operator need merely turn the adjustment screw 40 to the desired setting. In the event that the desired setting is exceeded, the operator need merely backoff on the adjustment and the carriage 36 will respond immediately. Hence, there is no need for a rocking type trial and error procedure that is generally experienced in the prior art. In addition to the foregoing, once the desired setting has been achieved, there is no need for any locking device. The tight threaded coupling between the carriage 36 and the shaft 48, and the force between the carriage 36 and the shaft 60, maintain the setting, even under the vibrating conditions that such transducer expected to be subjected to.

I claim:

1. An adjustment mechanism comprising:
a rotatable threaded member;
carriage means, including a threaded portion, coupled to said threaded member for movement in response to the rotation of the threaded member;
guide means including a shaft extending generally parallel to said threaded member and through an aperture formed in said carriage means for preventing the rotation of said carriage means in response to the rotation of said threaded member;
said resilient means including a spring positioned around said shaft; and
wherein said aperture formed in said carriage means is in the form of an open ended slot providing a forked end, one forcated member of such end having a dimension extending in the direction of said shaft substantially less than the corresponding dimension of the other forcated member, and
said other forcated member being formed with a beveled edge that engages the resilient means to cause a force to be generated in a first direction generally parallel to said shaft forwards said carriage to apply a continuous twisting moment between the threaded coupling between said carriage means and said threaded member in a direction to provide a tight coupling therebetween, and a force to be generated in a second direction generally normal to said shaft to cause said carriage means to rotate about said threaded coupling to continuously engage a side of the aperature against the shaft.

2. An adjustment mechanism as defined in claim 1 wherein:
said resilient means includes a movable member slidably mounted on said shaft and positioned between said spring and said carriage and including a curved portion for engaging the beveled portion of said carriage means.

3. An adjustment mechanism as defined in claim 2 wherein:

said threaded member comprises elongated cylindrical shaft having a threaded portion and a non-threaded portion, wherein said non-threaded portion is positioned in a cylindrical bearing mounted on a base.

said carriage means is formed with a threaded aperture for mounting said carriage means on said threaded shaft of said threaded member, and said guide means shaft is mounted at one end thereof to the same base as said threaded member.

4. An adjustment mechanism as defined in claim 3 wherein:

said rotatable threaded member includes a pair of bearing surfaces at opposite ends of the non-threaded portion of said cylindrical shaft that engage the cylindrical bearing; and said first rotational moment provide a tight bearing coupling therebetween.

* * * * *